United States Patent
Schmitt et al.

(10) Patent No.: US 10,696,284 B2
(45) Date of Patent: Jun. 30, 2020

(54) BRAKE-PRESSURE CONTROL DEVICE

(71) Applicant: Continental Teves AG & Co. oHG, Frankfurt (DE)

(72) Inventors: Pierre Schmitt, Karlstadt (DE); Johannes Görlach, Langgöns (DE); Theo Baukholt, Kriftel (DE); Peter Geiß, Kronberg (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 110 days.

(21) Appl. No.: 15/779,178

(22) PCT Filed: Nov. 17, 2016

(86) PCT No.: PCT/EP2016/077951
§ 371 (c)(1),
(2) Date: May 25, 2018

(87) PCT Pub. No.: WO2017/093028
PCT Pub. Date: Jun. 8, 2017

(65) Prior Publication Data
US 2018/0345939 A1    Dec. 6, 2018

(30) Foreign Application Priority Data

Dec. 2, 2015   (DE) .................. 10 2015 224 019
Jun. 1, 2016   (DE) .................. 10 2016 209 537

(51) Int. Cl.
*B60T 13/74* (2006.01)
*F16D 7/02* (2006.01)
(Continued)

(52) U.S. Cl.
CPC ............ *B60T 13/745* (2013.01); *B60T 13/74* (2013.01); *F16D 7/024* (2013.01); *F16D 2121/24* (2013.01); *F16D 2125/40* (2013.01)

(58) Field of Classification Search
None
See application file for complete search history.

(56) References Cited

U.S. PATENT DOCUMENTS 5,667,283 A * 9/1997 Drennen .................. B60T 8/00
                                                    303/115.2
6,056,090 A    5/2000 Reimann et al.
(Continued)

FOREIGN PATENT DOCUMENTS

DE        19741865 C1    6/1998
DE     102010039916 A1    3/2011
(Continued)

OTHER PUBLICATIONS

International Search Report and Written Opinion for International Application No. PCT/EP2016/077951, dated Feb. 17, 2017, 8 pages.

(Continued)

*Primary Examiner* — Mark A Manley
(74) *Attorney, Agent, or Firm* — RatnerPrestia

(57) ABSTRACT

A brake-pressure control device for a motor-vehicle braking system, with an electric motor, the rotatory motion of which is transformed by a ball screw drive into a translatory motion of a piston in a working cylinder, in order to be able to build up a defined braking pressure in a wheel brake independently of actuation of a master brake cylinder. An aspect provides that the ball screw drive is provided with a friction slip coupling engaged over a profiled tube which is fixedly connected to a nut of the ball screw drive and to which the piston is fixed.

11 Claims, 4 Drawing Sheets

(51) Int. Cl.
*F16D 121/24* (2012.01)
*F16D 125/40* (2012.01)

(56) References Cited

U.S. PATENT DOCUMENTS

| | | | |
|---|---|---|---|
| 6,325,182 B1* | 12/2001 | Yamaguchi | B60T 13/741 188/162 |
| 6,767,305 B2 | 7/2004 | Backes et al. | |
| 6,966,545 B2 | 11/2005 | Eising et al. | |
| 8,733,512 B2 | 5/2014 | Kim | |
| 9,003,903 B2 | 4/2015 | Drumm | |
| 9,834,188 B2 | 12/2017 | Feigel | |
| 2004/0016606 A1* | 1/2004 | Osterday | F16D 55/36 188/72.8 |
| 2005/0160846 A1 | 7/2005 | Chiang | |
| 2013/0105254 A1* | 5/2013 | Isono | B60T 13/741 188/72.3 |
| 2013/0298550 A1* | 11/2013 | Leiber | B60T 13/74 60/545 |
| 2015/0203087 A1 | 7/2015 | Ozsoylu et al. | |
| 2016/0305519 A1 | 10/2016 | Schumann et al. | |

FOREIGN PATENT DOCUMENTS

| | | |
|---|---|---|
| DE | 102013223859 A1 | 5/2015 |
| EP | 1400483 A1 | 3/2004 |
| GB | 2329437 A | 3/1999 |
| JP | H11193836 A | 7/1999 |
| KR | 20110124818 A | 11/2018 |
| WO | 0173312 A1 | 10/2001 |
| WO | 2012172317 A1 | 12/2012 |
| WO | 2015081951 A1 | 6/2015 |

OTHER PUBLICATIONS

German Search Report for German Application No. 10 2016 209 537.4, dated May 10, 2017, including partial English translation, 8 pages.
Korean Office Action for Korean Application 10-2018-7014523, dated Dec. 20, 2018, with translation, 19 pages.
Korean Decision to Grant a Patent for Korean Application No. 10-2018-7014523, dated Aug. 20, 2019 with translation, 2 pages.

* cited by examiner

BRAKE-PRESSURE CONTROL DEVICE

CROSS REFERENCE TO RELATED APPLICATIONS

This application is the U.S. National Phase Application of PCT International Application No. PCT/EP2016/077951, filed Nov. 17, 2016, which claims priority to German Patent Application No. 10 2015 224 019.3, filed Dec. 2, 2015, and German Patent Application No. 10 2016 209 537.4, filed Jun. 1, 2016, the contents of such applications being incorporated by reference herein.

FIELD OF THE INVENTION

The invention relates to a brake-pressure control device for a motor vehicle braking system.

BACKGROUND OF THE INVENTION

A brake-pressure control device for a motor vehicle braking system is known from DE 10 2013 223 859 A1, which is incorporated by reference herein. The brake-pressure control device has an electric motor, the rotatory motion of which is transformed into a translatory motion of a piston, in order to be able to build up a defined braking pressure in a wheel brake independently of actuation of a master brake cylinder.

SUMMARY OF THE INVENTION

An aspect of the invention is a brake-pressure control device of the given type with structural means that are simple as possible, while being particularly compact and reliable.

BRIEF DESCRIPTION OF THE DRAWINGS

Further features of an aspect of the invention are given in the individual claims and in the description of an exemplary embodiment with reference to three drawings.

The drawings show.

DETAILED DESCRIPTION OF THE PREFERRED EMBODIMENTS

Figure 1:
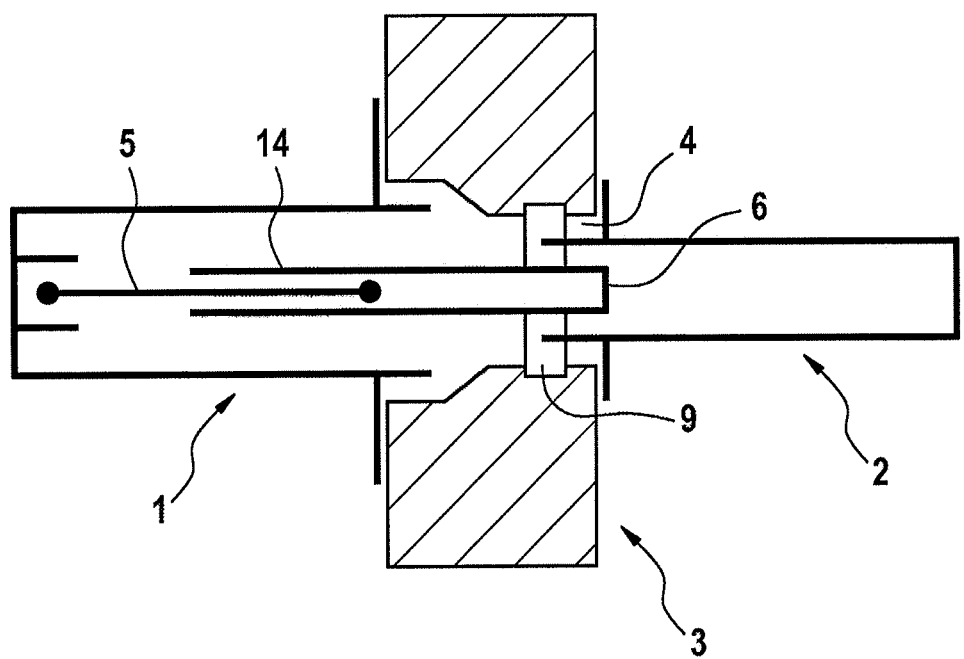
FIG. 1 a diagrammatic structure of the brake-pressure control device according to an aspect of the invention in longitudinal section, FIG. 2 in a perspective view, a ball screw drive with a friction slip coupling placed on its profiled tube, FIG. 3 an exploded view of all components of the friction slip coupling, FIG. 4 in longitudinal section, the friction slip coupling shown in FIG. 3 after insertion of all components in the coupling housing.

In detail, FIG. 1 shows in longitudinal section a diagrammatic structure of the brake-pressure control device according to an aspect of the invention, with an electric motor, the rotatory motion of which is transformed by means of a ball screw drive 14 into a translatory motion of a piston 6, in order to be able to build up a defined braking pressure in a wheel brake independently of actuation of a master brake cylinder.

To create as simple and reliable a structure as possible for a brake-pressure control device, it is provided that the electric motor is received in a first housing 1 and the piston 6 is received in a second housing 2; for this, the second housing 2, designed as a working cylinder, is arranged diametrically opposed to the first housing 1. A third housing 3 is arranged between the first and second housings 1, 2, and has two diametrically opposed end faces on which the first and second housings 1, 2 respectively are fixed. The third housing 3 thus performs the function of a central housing, on or in which all further components of the brake-pressure control device are arranged.

As FIG. 1 also shows, the third housing 3, configured as a central housing, has a passage bore 4 for receiving a friction slip coupling 9 and for passage of the ball screw drive 14, so that in connection with the piston 6 arranged in the second housing 2, the function of a linear actuator is guaranteed by a particularly compact structure of the brake-pressure control device. Thus the ball screw drive 14 provided with the friction coupling 9 extends into the passage bore 4 as an assembly which can be handled and pretested autonomously.

Figure 2:
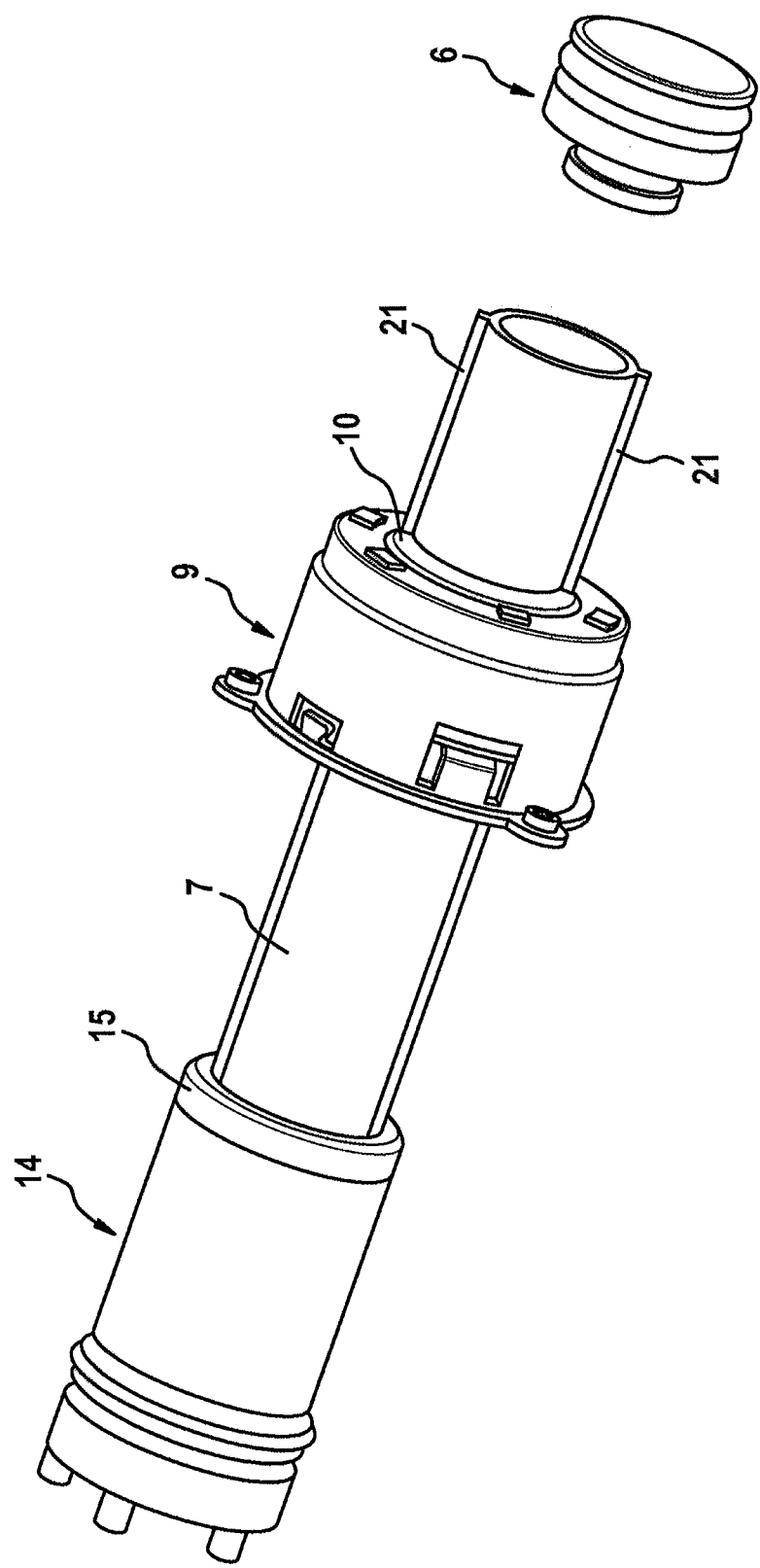

FIG. 2 shows in a perspective view the ball screw drive 14 before the play-free connection of the piston 6 on a profiled tube 7 which has a fixed connection to a nut 15 arranged on the profiled tube 7. The necessary drive moment of the electric motor acts on a spindle 5 arranged in the profiled tube 7 (see FIG. 1) of the ball screw drive 14; the torque acting on the nut 15 of the ball screw drive 14 is received by a torque bracket, thus creating the desired translatory motion of the profiled tube 7, the end portion of which is to be attached the piston 6. In the present exemplary embodiment, the torque bracket is formed by the friction slip coupling 9 which is arranged on the profiled tube 7 before installation of the piston 6; after installation of the piston on the profiled tube 7, the friction slip coupling 9 together with the ball screw drive 14 is mounted in the passage bore 4 of the housing 3. The friction slip coupling 9 thus ensures observation of the necessary radial degrees of freedom within the central housing (housing 3) in order to ensure perfect actuation of the piston 6 without mechanical stress in the ball screw drive 15. The friction slip coupling 9 stands in permanent mechanical contact with the profiled tube 7, for which the friction coupling 9 is provided with an inner ring 10 arranged to slide axially on the profiled tube 7, as shown in FIG. 3.

Figure 3:
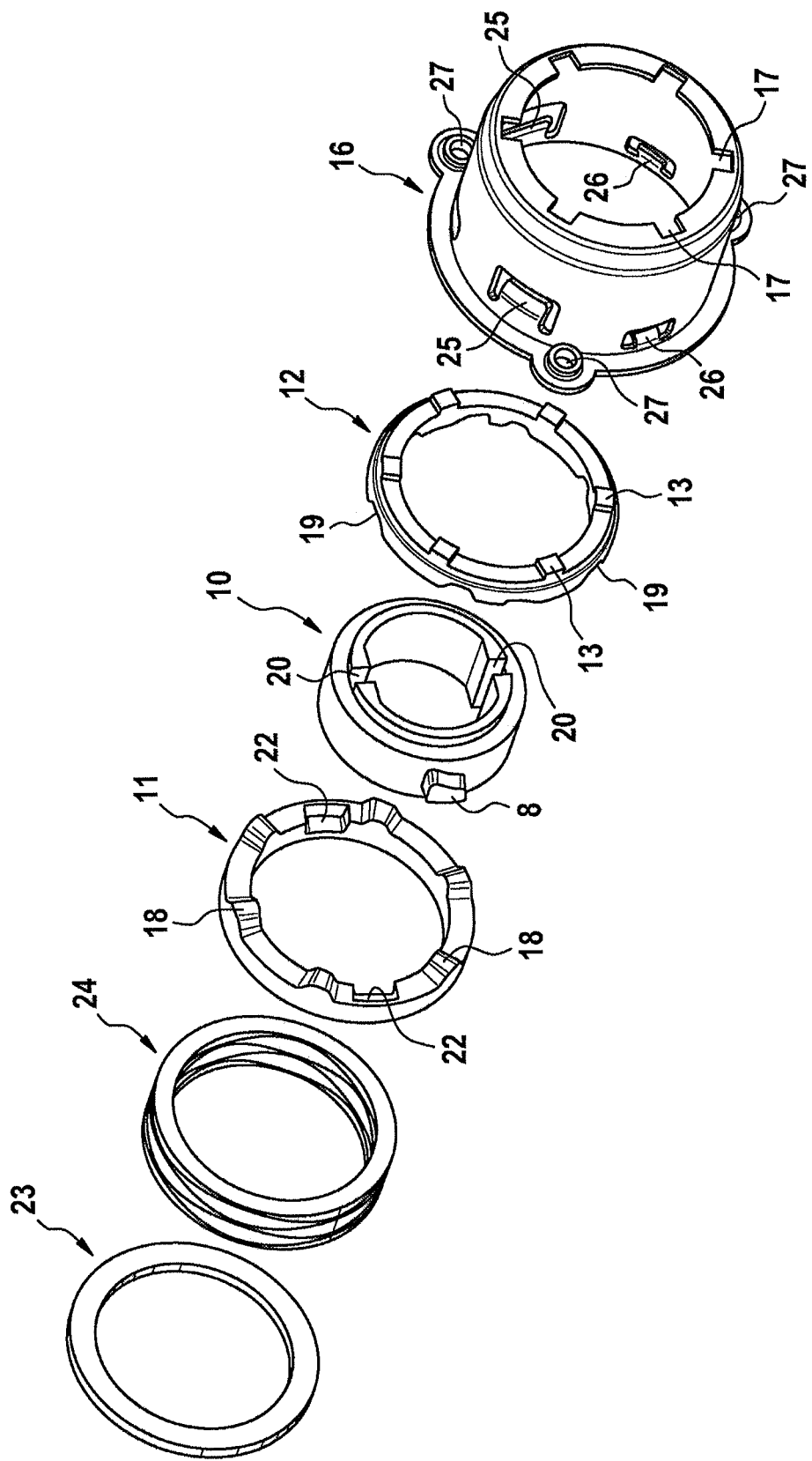

FIG. 3 shows in an exploded view the complete structure of the friction slip coupling 9, consisting of the inner ring 10 which is arranged between a pressure ring 11 and an outer ring 12. On the side facing away from the inner ring 10, the outer ring 12 has several axial protrusions 13 distributed evenly over the periphery, which after assembly are engaged in several cutouts 17 formed in a sleeve-like coupling housing 16. On the end facing the outer ring 12, the pressure ring 11 has several ramps 18 distributed evenly over the periphery, which in turn are engaged with several profiled contours 19 which are formed on the end face of the outer ring 12, facing the ramps 18, and are adapted to the contour of the ramps 18. On its inner casing, the inner ring 10 is provided with two longitudinal grooves 20; after installation of the coupling on the profiled tube 7 as shown in FIG. 2, two fixing eyes 27 arranged on the casing surface of the profiled tube 7 extend axially through said grooves. Furthermore, on its outer casing, the inner ring 10 has several pegs 8 which engage in radial recesses 22 in the pressure ring 11. Finally, an ondular washer 24 is clamped between the end face of the pressure ring 11 facing away from the inner ring 10 and an end plate 23 fixed to the coupling housing 16, which washer creates the contact force on the pressure ring 11 necessary for the function of the friction slip coupling 9.

Figure 4:
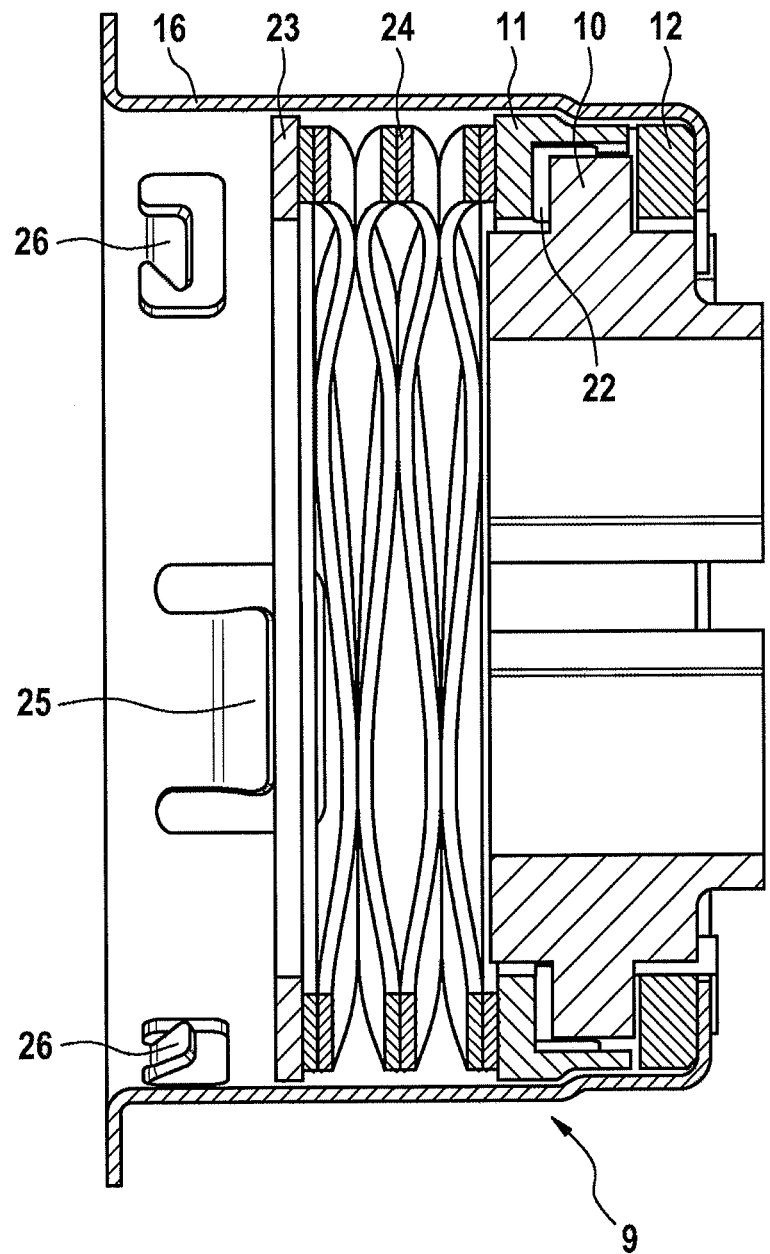

FIG. 4 illustrates in a longitudinal section the structure of the friction slip coupling 9 in the completed state, suitable for independent handling: according to this, in the following order of installation, first the outer ring 12 together with the inner ring 10 is inserted in the pot-like coupling housing 19 and engaged in the cutouts 17 of the right-hand coupling housing flange, followed by the pressure ring 11, the ondular washer 24 and finally the end plate 23; said plate is fixed by means of several clips 25 distributed over the periphery of the coupling housing 16 and thus positions the above-mentioned components captively in the coupling housing 16; for this, the end plate 23 is surrounded exclusively by the large clip 25, while the further smaller clips 26 ensure a fixing of the coupling housing 16 to the electric motor.

The structure described of the friction slip coupling 9 thus forms a particularly compact, pre-testable unit which does not restrict the profiled tube 7 with regard to the necessary degrees of freedom, so that seizing of the piston 6 in the housing 2 as a result of possible production tolerances is securely excluded. The above-mentioned components of the friction slip coupling 9 are thus all arranged in succession in order to form a so-called axial friction slip coupling.

The inner ring 10 serves as a slip partner for the profiled tube 7 of the ball screw drive 14. The torque is introduced into the central housing (housing 3) via the inner ring 10, the outer ring 12 and finally via the coupling housing 16, by means of several fixing elements provided on the outer periphery of the coupling housing. Preferred fixing elements are retaining screws to be screwed into the central housing, which pass through several fixing eyes 27 (so-called rim holes) formed on the periphery of the coupling housing 16, as can be seen particularly clearly in FIG. 3.

The friction slip coupling 9 is in constant contact with the profiled tube 7, which executes an axial stroke in the pressure build-up direction on each activation of the electric motor for the purpose of building up brake pressure. Therefore the friction coupling 9 must provide a low-wear slip partner for the profiled tube 7, so the correct material pairing between the inner ring 10 and the profiled tube 7 must be ensured.

On movement of the profiled tube 7 in the pressure-reduction direction, the pressure ring 11 and the outer ring 12 allow deployment, i.e. activation of the friction slip coupling in the event of a fault by means of the six ramps 18, in order to avoid an unbraked impact on retraction of the profiled tube 7 with high motor rotation speed in the direction of the rear stop, which corresponds to the base of the housing 1 in FIG. 1. Deployment and hence activation of the friction slip coupling 9 allows a targeted dissipation of the kinetic energy in order to prevent this impact. Consequently, the friction slip coupling 9 slips under a clearly defined torque (so-called deployment moment) in the pressure-reduction direction, and the kinetic energy is converted into heat because of the slip function. The clearly defined torque is necessary to exclude incorrect deployment of the friction coupling 9. The desired deployment or slip moment is determined both by the pretension of the ondular washer 24—which presses the pressure ring 11, inner ring 10 and outer ring 12 with a defined axial force—and by selection of a specific ramp angle and friction coefficient of the ramps 18 on the pressure ring 11, wherein in deployed state, the inner and pressure rings 10, 11 turn through 180° before they re-engage.

In the pressure build-up direction however, due to the design, it is not possible for the friction slip coupling 9 to deploy, so that the motor torque is securely transmitted for activation of the piston 6 arranged on the profiled tube 7.

LIST OF REFERENCE SIGNS

1 Housing
2 Housing
3 Housing
4 Passage bore
5 Spindle
6 Piston
7 Profiled tube
8 Peg
9 Friction slip coupling
10 Inner ring
11 Pressure ring
12 Outer ring
13 Protrusion
14 Ball screw drive
15 Nut
16 Coupling housing
17 Cutout
18 Ramp
19 Profiled contour
20 Longitudinal groove
21 Guide web
22 Recess
23 End plate
24 Ondular washer
25 Clip
26 Clip
27 Fixing eye

The invention claimed is:

1. A brake-pressure control device for a motor vehicle braking system, comprising an electric motor, the rotatory motion of which is transformed by a ball screw drive into a translational motion of a piston in a working cylinder, in order to be able to build up a defined braking pressure in a wheel brake without actuation of a master brake cylinder, wherein the ball screw drive is provided with a friction slip coupling engaged surrounding a radially outermost surface of a profiled tube which is fixedly connected to a nut of the ball screw drive and to which the piston is fixed, the friction slip coupling comprising a pressure ring, an outer ring, and an inner ring arranged axially between the pressure ring and the outer ring, the inner ring configured to slide axially on the profiled tube.

2. The brake-pressure control device as claimed in claim 1, wherein the electric motor is received in a first housing and the piston is received in a second housing which is diametrically opposed to the first housing), and a third housing is arranged between the first and second housings and has a passage bore in which the ball screw drive provided with the friction slip coupling extends, with the friction slip coupling engaged between the radially outermost surface of the profiled tube and a radially inner wall of the third housing.

3. The brake-pressure control device as claimed in claim 2, wherein the third housing has two diametrically opposed end faces on which the first and second housings respectively are fixed.

4. The brake-pressure control device as claimed in claim 1, wherein the friction slip coupling stands in a permanent mechanical contact with the profiled tube.

5. A brake-pressure control device for a motor vehicle braking system, comprising an electric motor, the rotatory motion of which is transformed by a ball screw drive into a translational motion of a piston in a working cylinder, in order to be able to build up a defined braking pressure in a wheel brake without actuation of a master brake cylinder, wherein the ball screw drive is provided with a friction slip coupling engaged surrounding a radially outermost surface of a profiled tube which is fixedly connected to a nut of the ball screw drive and to which the piston is fixed, the friction slip coupling comprising a pressure ring, an outer ring, and an inner ring arranged axially between the pressure ring and the outer ring, the inner ring configured to slide axially on the profiled tube, wherein on a side facing away from the inner ring, the outer ring has several axial protrusions distributed evenly over a periphery, which are engaged in several cutouts formed in a sleeve-like coupling housing.

6. The brake-pressure control device as claimed in claim 5, wherein an ondular washer is clamped between the end face of the pressure ring facing away from the inner ring and an end plate fixed to the coupling housing.

7. The brake-pressure control device as claimed in claim 5, wherein on an end facing the outer ring, the pressure ring has several ramps distributed evenly over the periphery, which are engaged in several profiled contours which are formed on the end facing of the outer ring and adapted to the contour of the ramps.

8. A brake-pressure control device for a motor vehicle braking system, comprising an electric motor, the rotatory motion of which is transformed by a ball screw drive into a translational motion of a piston in a working cylinder, in order to be able to build up a defined braking pressure in a wheel brake without actuation of a master brake cylinder, wherein the ball screw drive is provided with a friction slip coupling engaged surrounding a radially outermost surface of a profiled tube which is fixedly connected to a nut of the ball screw drive and to which the piston is fixed, wherein the friction slip coupling stands in a permanent mechanical contact with the profiled tube, for which purpose the friction slip coupling is provided with an inner ring arranged to slide axially on the profiled tube, and wherein on its inner casing, the inner ring is provided with two longitudinal grooves through which two guide webs, arranged on the casing surface of the profiled tube, extend axially for a form-fit connection.

9. A brake-pressure control device for a motor vehicle braking system, comprising an electric motor, the rotatory motion of which is transformed by a ball screw drive into a translational motion of a piston in a working cylinder, in order to be able to build up a defined braking pressure in a wheel brake without actuation of a master brake cylinder, wherein the ball screw drive is provided with a friction slip coupling engaged over a profiled tube which is fixedly connected to a nut of the ball screw drive and to which the piston is fixed, wherein the friction slip coupling stands in a permanent mechanical contact with the profiled tube, for which purpose the friction slip coupling is provided with an inner ring arranged to slide axially on the profiled tube, wherein the inner ring is arranged between a pressure ring and an outer ring, and wherein on its outer casing, the inner ring has several pegs which engage in radial recesses in the pressure ring.

10. A brake-pressure control device for a motor vehicle braking system, comprising an electric motor, the rotatory motion of which is transformed by a ball screw drive into a translational motion of a piston in a working cylinder, in order to be able to build up a defined braking pressure in a wheel brake without actuation of a master brake cylinder, wherein the ball screw drive is provided with a friction slip coupling engaged surrounding a radially outermost surface of a profiled tube which is fixedly connected to a nut of the ball screw drive and to which the piston is fixed, wherein the friction slip coupling has a sleeve-like coupling housing in which are arranged, in the following order from outside to inside, an end plate, an ondular washer, a pressure ring, an inner ring and an outer ring, which are held in the coupling housing by several clips distributed over the periphery of the coupling housing, for which purpose the end plate is contacted by the clips.

11. A brake-pressure control device for a motor vehicle braking system, comprising an electric motor, the rotatory motion of which is transformed by a ball screw drive into a translational motion of a piston in a working cylinder, in order to be able to build up a defined braking pressure in a wheel brake without actuation of a master brake cylinder, wherein the ball screw drive is provided with a friction slip coupling engaged surrounding a radially outermost surface of a profiled tube which is fixedly connected to a nut of the ball screw drive and to which the piston is fixed, wherein the friction slip coupling has a sleeve-like coupling housing which has several clips distributed over the periphery for fixing to the electric motor.

* * * * *